(12) United States Patent
Birch et al.

(10) Patent No.: US 6,461,058 B1
(45) Date of Patent: Oct. 8, 2002

(54) OPTOELECTRONIC COMPONENT

(75) Inventors: Kevin Birch, Stowmarket; Peter Gibson, Ipswich; Martyn Owen, Diss; David Parkinson, Ipswich; Stuart Wilkinson, Manningtree, all of (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/430,367

(22) Filed: Oct. 28, 1999

(51) Int. Cl.$^7$ .................................................. G02B 6/36
(52) U.S. Cl. .................................... 385/92; 385/94
(58) Field of Search ............................... 385/88, 89, 90, 385/91, 92, 93, 94, 140

(56) References Cited

U.S. PATENT DOCUMENTS

| | | | | |
|---|---|---|---|---|
| 4,913,511 A | * | 4/1990 | Tabalba et al. | 385/88 |
| 5,047,835 A | * | 9/1991 | Chang | 357/74 |
| 5,233,676 A | * | 8/1993 | Yonemura et al. | 385/88 |
| 5,285,512 A | * | 2/1994 | Duncan et al. | 385/94 |
| 5,596,663 A | * | 1/1997 | Ishibashi et al. | 385/92 |
| 5,966,487 A | * | 10/1999 | Gilliland et al. | 385/92 |
| 6,078,465 A | * | 6/2000 | Kodama | 360/97.01 |
| 6,085,006 A | * | 7/2000 | Gaio et al. | 385/92 |

\* cited by examiner

*Primary Examiner*—Cassandra Spyrou
*Assistant Examiner*—Euncha Cherry (57) ABSTRACT

An optoelectronic component, such as an optical transceiver, contains one or more optoelectronic devices, such as a semiconductor laser or a photodiode. It also contains a metallic or metallized housing within which the optoelectronic devices are mounted, and an optical connector part to allow optical radiation to be coupled between the optoelectronic devices and fibres of a fibre optic communications network. The optical connector is disposed at least partly within an aperture in the housing. A metallic or metallized barrier is disposed between the one or more optoelectronic devices and the optical connector substantially to shield against transmission of electromagnetic radiation through the aperture (except of course for the transmission of optical radiation to be provided to, or received from the fibre optic communications network). This barrier can be provided as part of a metallized clip, adapted to fit around the optical interface between the optoelectronic devices and the outside of the transceiver. The optoelectronic devices may be separated into an optical assembly and an electrical assembly, each with a separate conductive shield, in which case the metallized barrier may provide a part of the conductive shield for the optical components on the optical assembly.

17 Claims, 5 Drawing Sheets

Fig. 4C

OPTOELECTRONIC COMPONENT

FIELD OF INVENTION

This invention relates to an optoelectronic component. It is particularly relevant to a component, such as an optical transceiver, used as a part of a fibre optic optical transmission system.

PRIOR ART

Optoelectronic devices are electronic devices adapted to generate or receive optical radiation. Typical generating devices are semiconductor lasers and light emitting diodes, and a typical receiving device is a photodiode. A main use for optoelectronic devices is in fibre optic communications systems, in which signals are generated in one optoelectronic device (a transmitter) and received in another optoelectronic device (a receiver), between which the signals are transmitted through a network of fibres, switches and other routing components, and amplifiers. A further kind of optoelectronic device is a transceiver, adapted to both transmit and receive (generally, a transceiver will contain a transmitter element and a receiver element, each for connection to separate fibres of a network).

Optoelectronic devices are being designed for ever greater speeds of operation (generally in accordance with developing industry standards) in order to increase the rate of information transmission achievable through fibre optic networks. Achievement of greater speeds of operation, however, creates problems. Optoelectronic devices, and other types of electronic device, will generally emit electromagnetic radiation m operation, typically in the radio frequency. A requirement placed on optoelectronic devices is that such emissions of radiation fall below a threshold value (defined in EMC standards such as FCC class B). If the speed of the optoelectronic device increases, the amount of electromagnetic radiation increases, and the relevant EMC standard becomes more difficult to meet.

It is even more difficult to meet the EMC standard when electromagnetic radiation is generated not only by the optoelectronic device, but also by other electronic components within the same enclosure as the optoelectronic device (especially when these electronic components are also high speed components). Appropriate enclosure structures to provide EMC shielding are well known. However, it is difficult to achieve an effectively shielded enclosure for an optoelectronic component, as it is necessary for an effective optical connection to be made between the optoelectronic component and fibres of an fibre optic communications network.

In addition to these requirements, it is desirable for components such as optical transceivers to be manufacturable at minimum cost (both with low cost optoelectronic devices and with inexpensive manufacturing and assembly requirements). It is therefore desirable to achieve effective EMC shielding in a low cost, easily manufactured and assembled optoelectronic component.

SUMMARY OF INVENTION

Accordingly, the invention provides an optoelectronic component, comprising one or more optoelectronic devices, a metallic or metallized housing within which the one or more optoelectronic devices are mounted; an optical connector to allow optical radiation to be coupled between the one or more optoelectironic devices and fibres of a fibre optic communications network, wherein the optical connector is disposed within an aperture in the housing; and a metallic or metallized barrier disposed between the one or more optoelectronic devices and the optical connector substantially to shield against transmission of electromagnetic radiation through the aperture, except for the transmission of optical radiation to be provided to or received from the fibre optic communications network.

With this arrangement, effective electromagnetic shielding is provided even for the connector aperture, and hence for the whole component. Advantageously, the metallic or metallized barrier is electrically connected to at least a part of the metallic or metallized housing.

In a preferred arrangement, electrical and optical elements of the optoelectronic component are provided on separate substrates. (preferably printed circuit board substrates). Shielding is then most advantageously provided by providing separate conductive housings as shields for each of the optical and electrical components—in which case the metallized housing may contain electrically isolated parts which form parts of the separate conductive housings, and in which case the barrier may form a part of the conductive housing for the optical components.

It is particularly preferred that the metallic or metallized barrier be a part of a structural element of the optoelectronic component. In particular, the barrier may be a part of a clip used to connect parts of the optoelectronic component together—for example, to retain the optical assembly on the housing.

BRIEF DESCRIPTION OF FIGURES

Specific embodiments of the invention will be described below, by way of example, with reference to the accompanying Figures, in which.

DESCRIPTION OF SPECIFIC EMBODIMENTS

Figure 1:
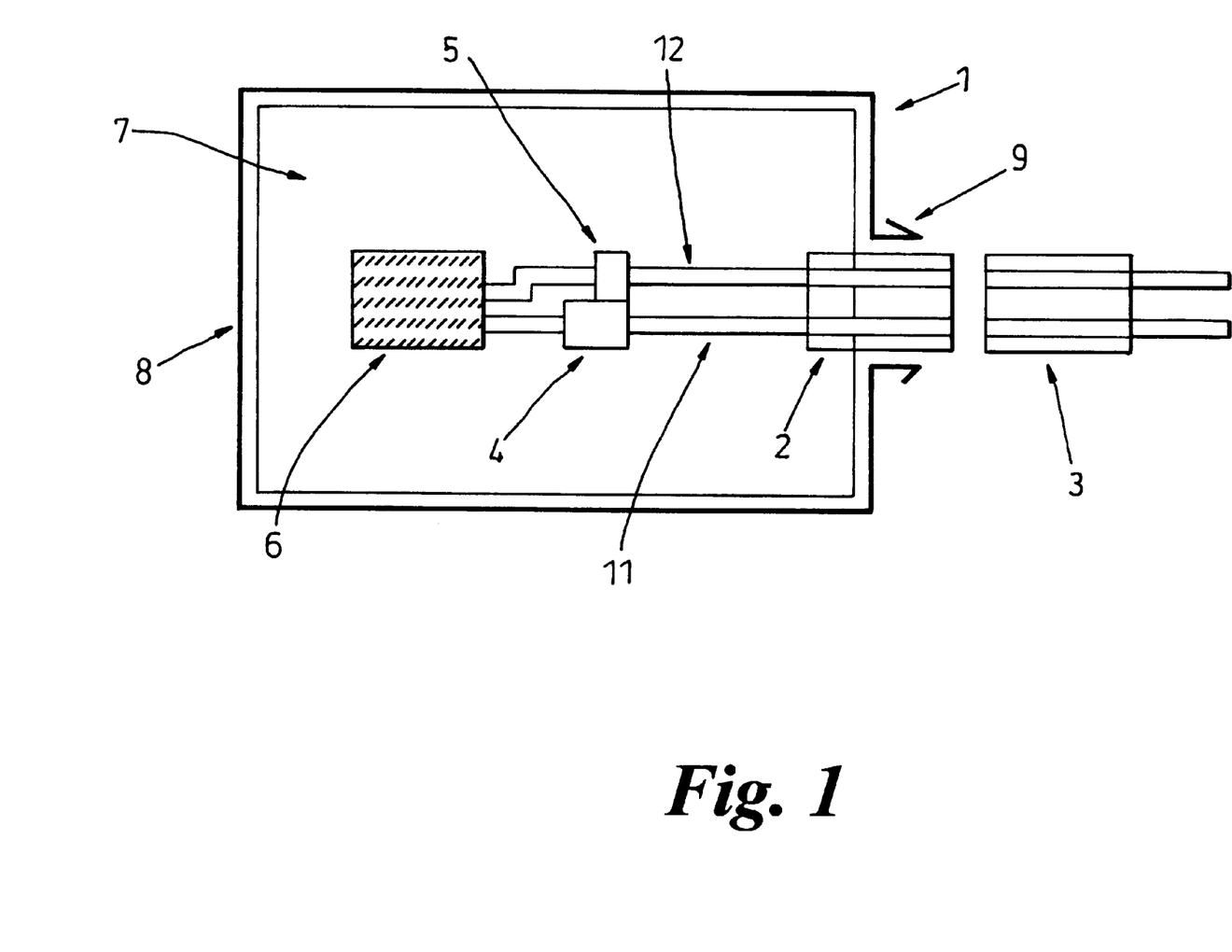
FIG. 1 shows a schematic representation of the elements of an optical transceiver.

FIG. 1 shows, schematically, basic elements of an optical transceiver 1 in which the present invention can be used. The transceiver 1 has two optoelectronic devices, specifically a semiconductor laser 4 and a photodiode 5. These devices can be of a number of different conventional constructions, which can readily be chosen by the skilled man according to the desired specification of the transceiver. Examples of suitable components are described in various papers such as "highly reliable plastic packaging for laser diode and photodiode modules used for access network", M.Fukuda et all, Electronic letters Vol 33 no 25. These optoelectronic devices have associated electronic circuitry 6, which may again be of -conventional design appropriate to the optoelectronic devices concerned. The optoelectronic devices and the associated electronic circuitry need to be mounted on an appropriate substrate or substrates 7—these may consist of one or more printed circuit boards. The substrate 7 is located within a metallic or metallized housing 8, which protects against electromagnetic emissions. The housing is provided with means 9 to allow connection between the housing 8, and another component or object (such as a chassis holding a number of such components).

The transceiver must of course also be provided with a connector part 2 to allow optical signals to be transmitted both in and out of the transceiver (for example, between the transceiver 1 and a fibre optic network, represented here by connector 3). This connector part 2 is mounted to the housing 8 and is located at least partly within an aperture in the housing. Light generated in the transmitter 4 passes into a first pigtail fibre 11 retained in the connector part 2, and light enters the receiver 5 through a second pigtail fibre 12 also retained in the connector part 2. When an appropriate connector 3 of a fibre optic network is engaged with the connector part 2, the transmitter 4 and receiver 5 are thus placed in optical connection with appropriate fibres of the fibre optic network. On top of the electronics assembly 43, there are provided two rows of spring fingers 45.

Although the housing 8 can provide substantial electromagnetic shielding for the electronic components inside, this shielding is significantly less than complete. This is because of the presence of the connector part 2, which requires the presence of a significant aperture within the housing 8. This unshielded aperture can be a source of significant unwanted electromagnetic radiation (though it is of course required to allow the passage of the wanted electromagnetic radiation—light passing through first and second pigtail fibres 11, 12).

Figure 2A:
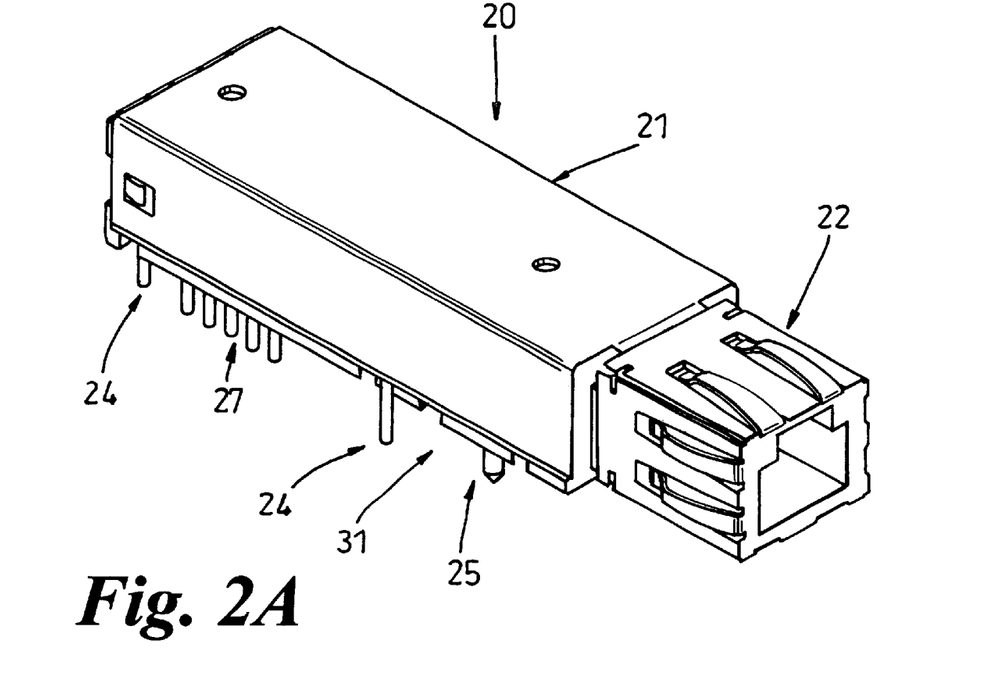
FIGS. 2A and 2B show perspective views of an optical transceiver according to an embodiment of the invention provided as a component for mounting to a chassis and as mounted to a chassis respectively.
Figure 2B:
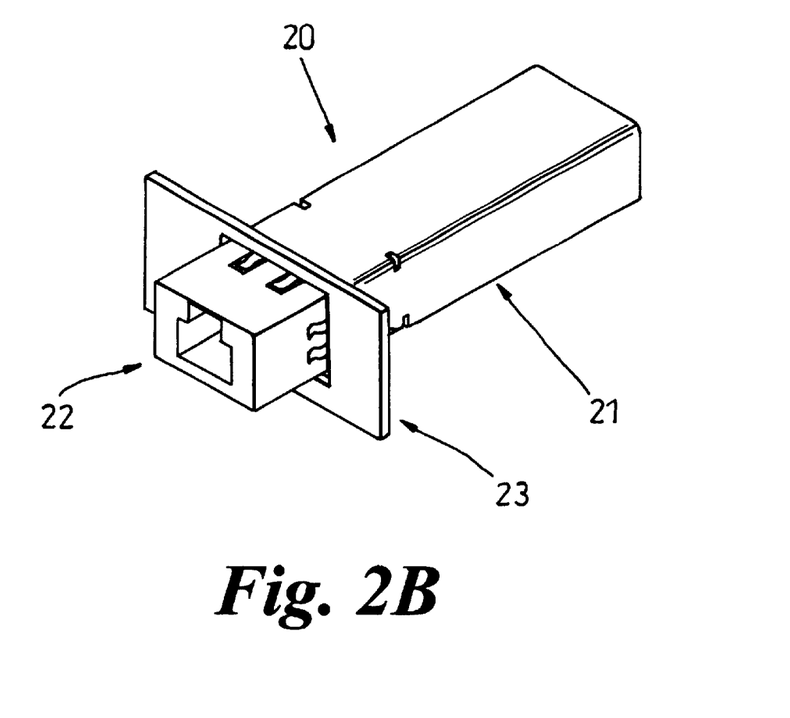

An optical transceiver is shown from perspective views in FIGS. 2A and 2B unmounted and mounted to a chassis respectively. The transceiver 20 has a metallized outer shield 21 and, at the connector end of the transceiver 20, a nose shield 22 engaged with the housing (mainly located within the package) and adapted to engage here with the front panel 23 of a chassis. Even if the chassis itself forms an electromagnetic shield, the aperture in the chassis m which the transceiver 20 is mounted allows for leakage of electromagnetic radiation from the optoelectronic devices within the transceiver 20.

The optical transceiver of FIGS. 2A and 2B is in fact an embodiment of the invention. An inventive aspect that is illustrated in these drawings is the provision of a conductive housing at chassis ground around the optical components and a conductive housing at signal ground around the electronic components. The metallized outer shield 21 is at signal ground, as are grounding lugs 24 (which are a part of outer shield 21). However, the nose shield 22 is at chassis ground, as are solder posts 25, attached to the base of a lower housing part 31. The other pins shown are connectors 27 to the electronics assembly (described further below).

Figure 3:
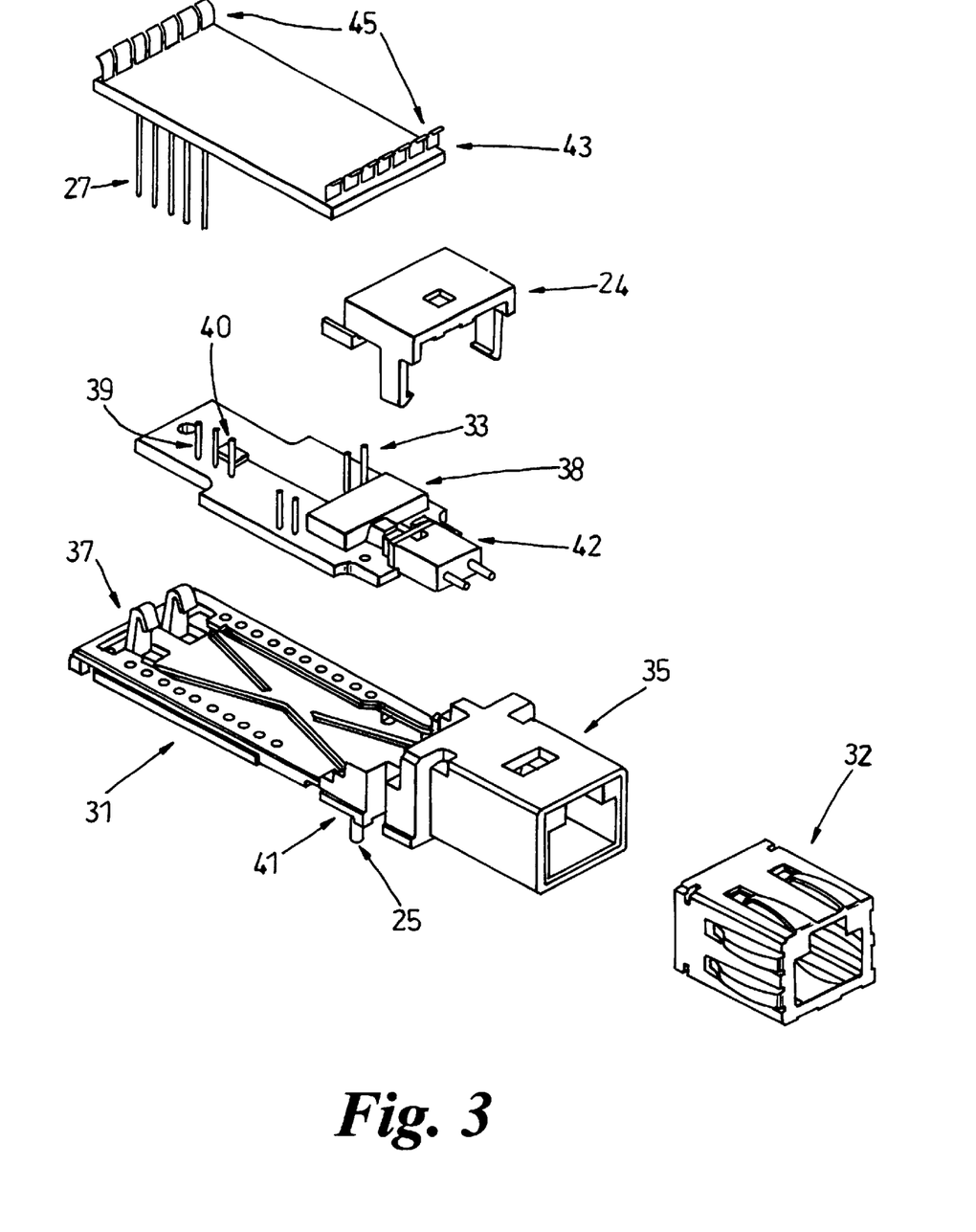
FIG. 3 shows an exploded view illustrating most elements of the optical transceiver of FIGS. 2A and 2B.

FIG. 3 shows, in an exploded view, certain elements of the transceiver design according to the embodiment of the invention shown in FIGS. 2A and 2B. The arrangement uses a lower housing part 31 which is metallized (and to which a nose shield 32 is attached at the connector end), an optical assembly 33 mounted on a printed circuit board substrate and attached to the lower housing part 31, and an electronics assembly 43 also provided on a printed circuit board substrate and removably engageable from the optical assembly 33 and the lower housing part 31. Also provided is a metallized clip 34. Each of these parts is described in greater detail below.

In the lower housing part 31, the connector part 35 is according to the Mr connector interface (an industry standard described for example in the FOCUS 12 document TIA/EIA-604-12) though the type of connector interface employed is not significant to the invention. The lower housing part 31 is metallized. However, this metallization is split at land 41 (behind the solder posts 25) so the connector end of the lower housing part 31 forms part of a conductive housing about the optical components, and the other end of the lower housing part 31 forms part of a conductive housing around the electronic components.

The optical assembly 33 is adapted to locate on to the lower housing part 31, partly by means of complementary structures on the two elements, and partly by the retaining action of retaining clips 37 formed on the lower housing part 31. The optical assembly 33 is formed on a printed circuit board substrate, and mounted on the substrate are the optical components (here, transmitter silicon assembly 40 comprising a silicon v-groove structure for support and alignment of the fibre, a laser diode and monitor diode. The receiver silicon subassembly is mounted beneath the receiver shield 38 and comprises a silicon v-groove structure for support and alignment of the receiver optical fibre, a photodetector, and a pre-amplifier) and a fibre pigtail block 42 which locates the fibre pigtails with respect to the optical devices (in co-operation with the v-grooves in the silicon subassemblies 40 and 38) and with respect to the connector part 35. Posts 39 formed on the substrate are adapted to provide electrical connection between the optical assembly 33 and the electronics assembly 43.

Figure 4A:
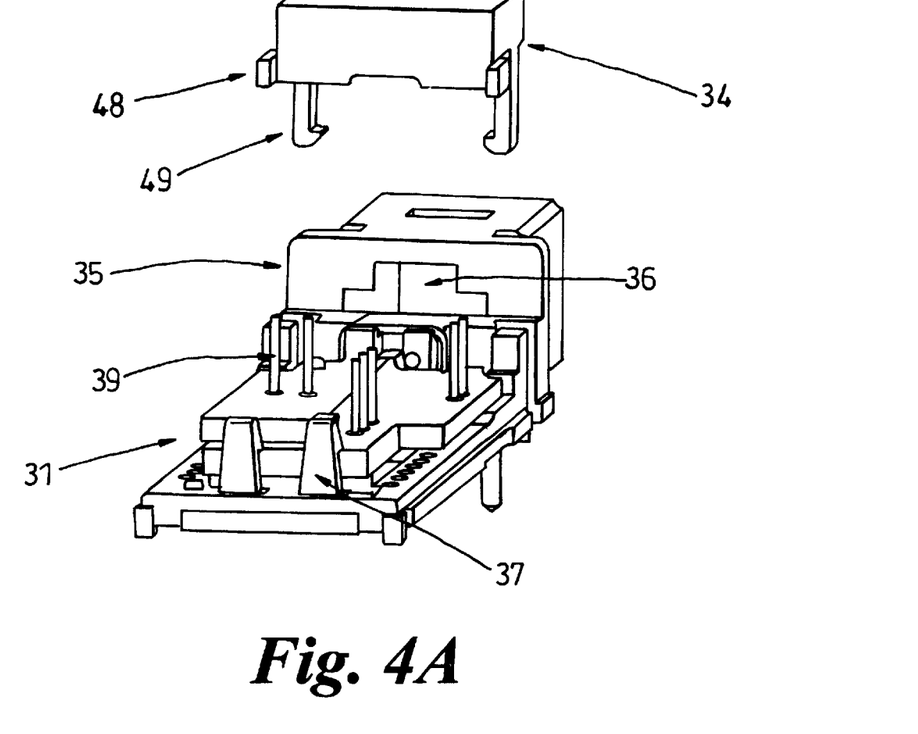
FIGS. 4A, 4B and 4C show the optical transceiver of FIG. 3 at different stages of assembly (in FIGS. 4A and 4B one element of the optical assembly is shown removed).

As can be seen from FIG. 4A, this arrangement leaves a significant aperture 36 in the shielding through the connector part 35. In FIG. 4A, the receiver shield 38 has been removed for convenience of view—however, it is clear from FIG. 3 that shielding provided by the shield in the subassembly 38 will not be disposed to provide effective shielding of this aperture 36. However, the printed circuit board substrate of the optical assembly 33 does have internal ground planes, and these internal ground planes are used to provide shielding below the optical components.

Shielding for the aperture 36 is provided by the metallized clip 34. This is adapted to clip over the optical assembly 33. The metallized clip 34 forms a key part of the conductive housing at chassis ground for the optical components and is disposed so as substantially to shield against transmission of electromagnetic radiation through the aperture 36, as can be seen from FIG. 4B. A channel through this barrier is provided to allow the pigtail fibres to pass through, but apart from this channel the metallized clip serves to prevent the unwanted escape of electromagnetic radiation from any of the electronic components within the transceiver. The conductive housing for the optical components is thus provided by the clip 34, the lower housing part 31 (at the connector end), the nose piece 32 and internal ground planes of the optical assembly printed circuit board.

Figure 4B:
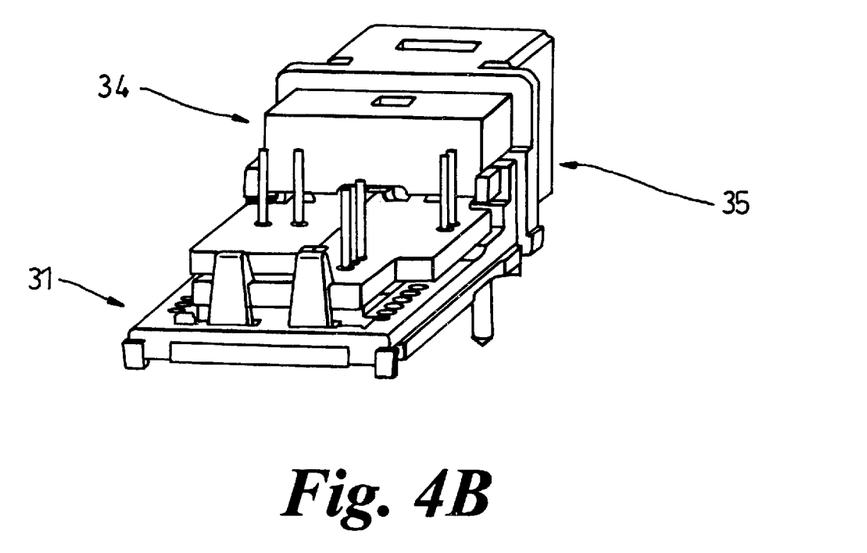

In addition to its shielding role, the clip 34 also has a structural role within the optical transceiver. Spring fingers 49 allow the clip to be located over the optical assembly 33 and retained against the lower housing part 31—this in fact has a role in the shielding function, as the connection between the spring fingers 49 and the lower housing part 31 is used to provide an electrical connection between them as a part of the conductive housing at chassis. ground. However, this connection also physically holds the optical assembly 33 in place. Moreover, the clip 34 has a role in supporting the electronics assembly by means of side bars 48, as is described fisher below.

The next element of the optical transceiver is the electronics assembly 43, This contains the electronic components of the transceiver, which are disposed on a separate printed circuit board substrate. The electronics assembly 43 is located over the optical assembly 33. Seven pins 39 on the optical assembly pass through the electronics assembly 43 and make connection to conductive tracks on it in order to provide electrical connection between the optoelectronic components of the transceiver and the transceiver electronics. Ten pins 27 protrude from the lower surface of the electronics assembly 43 and pass through the lower housing part 31—these provide the electrical interface between the optical transceiver as a whole and other components (i.e. these provide the pins of the transceiver package). Physically, the electronics assembly 43 rests on the retaining clips 37 and abuts the side bars 48 of the metallized clip 34.

Separation of the optical assembly and the electronics assembly is advantageous as it enables a particularly effective shielding solution, as is described here. However, a further significant advantage is that the optical assembly 33 can be optimised for optical alignment without influence from the electronics assembly (which simply locates over it) and that failure of either the optical or electronics assembly during manufacture need not result in waste of the whole device, as the faulty assembly can simply be replaced.

Figure 4C:
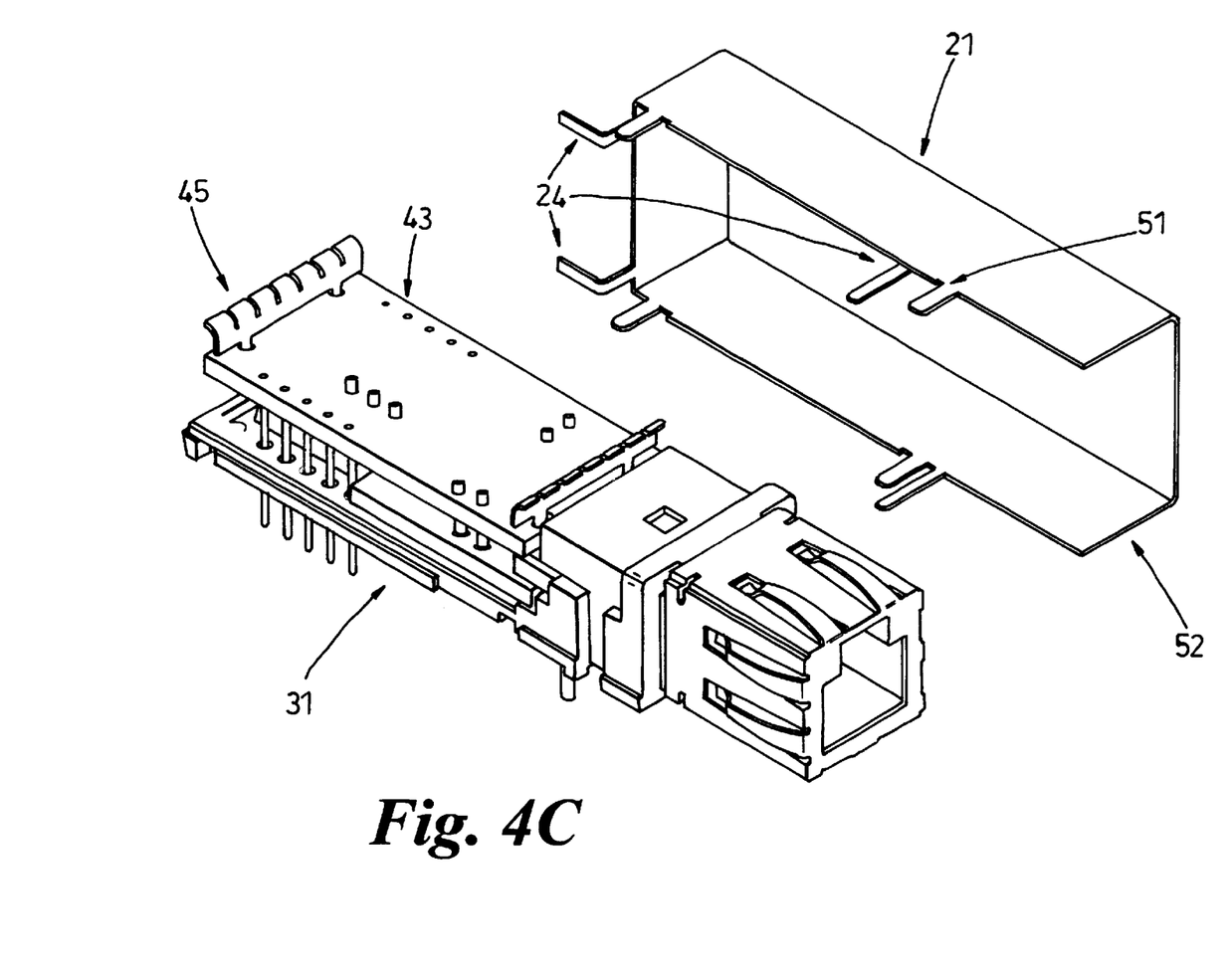

FIG. 4C shows how the addition of the metallic outer shield 21 provides the conductive housing at signal ground for the electronics components. On the top of the electronics assembly 43 there are provided two rows of spring fingers 45 for contact with the inner part of the outer shield 21 when the outer shield 21 is assembled to the transceiver. This connection is made by folding securing tabs 51 over so as to engage with corresponding grooves on the bottom of the lower housing part 31. PCB grounding lugs 24 are adapted to provide a ground connection to other system elements (vernal to the transceiver). A part of the inner surface of the outer shield 21 to has an insulating inner surface 52 to prevent electrical connection between the chassis ground conductive housing for the optical elements and the signal ground conductive housing for the electronic elements. The signal ground conductive housing is provided by the outer shield 21, the part of the lower housing part 3 remote from the connector, the spring fingers 35 and advantageously internal ground planes of the electronics assembly printed circuit board.

The arrangement described achieves particularly effective shielding, both of the component as a whole and, by the separate shielding of the electronics and the optical components, within the component itself. A key element in providing this shielding is the metallized clip 34—however this metallized clip also has a significant structural role within the component. The use of separate assemblies for the optical and the electronics components also has an important role in the shielding solution provided, particularly to. achieve separate shielding of electrical and optical components, as well. as having significant manufacturing advantages.

The present invention is particularly effective to achieve satisfactory electromagnetic shielding for an optical transceiver which can be manufactured at low cost. The use of the shielding approach of the present invention combined with the structural role of the new shielding element provide still further advantages in achieving a simple and easily manufacturable component.

What is claimed is:

1. An optoelectronic component, comprising:
   one or more optoelectronic devices;
   a metallic or metallized housing within which the one or more optoelectronic devices are mounted;
   an optical connector including one or more pigtail optical fibers, the optical connector arranged to allow optical radiation to be coupled between the one or more optoelectronic devices and fibers of a fibre optic communications network, wherein the optical connector is disposed within an aperture in the housing; and
   a metallic or metallized barrier disposed between the one or more optoelectronic devices and the optical connector, the barrier being arranged to allow the one or more pigtail optical fibers to pass through and to substantially shield against transmission of electromagnetic radiation through the aperture, except for the transmission of optical radiation to be provided to or received from the fiber optic communications network, wherein the barrier is comprised in a clip adapted to retain an optical assembly substrate of the one or more optoelectronic devices securely within the housing.

2. An optoelectronic component as claimed in claim 1, wherein the barrier is electrically connected to the housing.

3. An optoelectronic component as claimed in claim 1, wherein the barrier is electrically connected to a ground plane of the one or more optoelectronic devices.

4. An optoelectronic component as claimed in claim 1, comprising a first printed circuit board substrate having an optical subassembly of the one or more optoelectronic devices thereon and a second printed circuit board substrate having electronic circuits of the one or more optoelectronic devices thereon.

5. An optoelectronic component as claimed in claim 4, wherein a first conductive housing is provided around the optical subassembly and a second conductive housing is provided around the electronic circuits.

6. An optoelectronic component as claimed in claim 5, wherein the metallic or metallized barrier is provided as a part of the second conductive housing.

7. An optoelectronic component as claimed in claim 6, wherein the barrier is comprised in an element adapted to maintain the structure of the optoelectronic component.

8. An optoelectronic component as claimed in claim 7, wherein the barrier is comprised in a clip adapted to retain an optical assembly substrate of the one or more optoelectronic devices securely within the housing.

9. An optoelectronic component as claimed in claim 5, wherein the first conductive housing is connected to a chassis ground and the second conductive housing is connected to a signal ground.

10. An optoelectronic component as claimed in claim 2, wherein the barrier is electrically connected to a ground plane of the one or more optoelectronic devices.

11. An optoelectronic component as claimed in claim 1, wherein electronic circuits of the one or more optoelectronic devices are provided on a separate substrate from the optical assembly of the one or more optoelectronic devices, and the clip is adapted to locate the electronic circuit substrate with respect to the optical assembly substrate.

12. An optoelectronic component as claimed in claim 1, wherein the optoelectronic component is an optical transceiver.

13. The optoelectronic component as claimed in claim 1, wherein the optical connector is mounted to the metallized housing.

14. A fiber optical transmission system that effectively shields electromagnetic radiation, comprising
    electronic circuits;
    a transmitter connected to the electronic circuits for transmitting optical signals;
    a receiver connected to the electronic circuits for receiving optical signals;
    a first optical connector;

a first pigtail optical fiber with a first end connected to the receiver and a second end connected to the first optical connector;

a second pigtail optical fiber with a first end connected to the transmitter and a second end connected to the first optical connector;

a metallized cuter shield located outside the electronic circuits, the transmitter, the receiver, the first optical connector, and the pigtail optical fibers to shield electromagnetic radiation from these devices, the outer shield having an aperture just big enough to allow the first optical connector to pass through;

a clip adapter to retain an optical assembly substrate of the electronic circuits securely within the outer shield;

a second opt gal connector connected to the first optical connector; and optical fibers connected to the second optical connector for transmission of the optical signals.

15. The fiber optical transmission system described in claim 14, wherein the transmitter is a semiconductor laser.

16. The fiber optical transmission system described in claim 14, wherein the receiver is a photodiode.

17. An optoelectronic component, comprising:

one or more optoelectronic devices;

a metallic or metallized housing within which the one or more optoelectronic devices are mounted;

an optical connector including one or more pigtail optical fibers, the optical connector arranged to allow optical radiation to be coupled between the one or more optoelectronic devices and fibers of a fiber optic communications network, wherein the optical connector is disposed within an aperture in the housing; and a metallic or metallized barrier disposed between the one or more optoelectronic devices and the optical connector, the barrier being arranged to allow the one or more pigtail optical fibers to pass through and to substantially shield against transmission of electromagnetic radiation through the aperture, except for the transmission of optical radiation to be provided to or received from the fiber optic communications network, wherein the barrier comprising a clip adapted to retain an optical assembly substrate of the one or more optoelectronic devices securely within the housing.

* * * * *

UNITED STATES PATENT AND TRADEMARK OFFICE
CERTIFICATE OF CORRECTION

PATENT NO.   : 6,461,058 B1
DATED        : October 8, 2002
INVENTOR(S)  : Kevin Birch It is certified that error appears in the above-identified patent and that said Letters Patent is hereby corrected as shown below:

Column 6,
Line 2, change "fibre optic" to -- fiber optic --

Column 7,
Line 7, change "metallized cuter" to -- metallized outer --
Line 13, change "clip adapter" to -- clip adapted --
Line 15, change "second opt gal" to -- second optical --

Signed and Sealed this

Fourth Day of March, 2003

JAMES E. ROGAN
*Director of the United States Patent and Trademark Office*